United States Patent
Wesch et al.

(10) Patent No.: US 7,238,407 B2
(45) Date of Patent: Jul. 3, 2007

(54) MULTI-LAYER REINFORCING LAMINATE

(75) Inventors: Karl Wesch, Waldbrunn (DE); Matthias Jaehnichen, Sandhausen (DE); Adriano Morozini De Lira, Leonberg (DE); Juergen Durm, Muehlacker (DE); Dietger Frisch, Wimsheim (DE)

(73) Assignees: Henkel Kommanditgesellschaft Auf Aktien, Duesseldorf (DE); Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/108,579

(22) Filed: Apr. 18, 2005

(65) Prior Publication Data

US 2005/0239357 A1  Oct. 27, 2005

Related U.S. Application Data

(63) Continuation of application No. PCT/EP2003/011618, filed on Oct. 21, 2003.

(30) Foreign Application Priority Data

Oct. 30, 2002  (DE) .................................. 102 50 780

(51) Int. Cl.
*B32B 3/10* (2006.01)
*B32B 27/12* (2006.01)

(52) U.S. Cl. .................. 428/138; 428/457; 428/77; 428/78; 428/113; 428/114; 428/298.1; 428/297.7; 428/212; 442/32

(58) Field of Classification Search .................. 428/138, 428/457, 77, 78, 113, 114, 298.1, 297.7, 212, 428/32

See application file for complete search history.

(56) References Cited

U.S. PATENT DOCUMENTS

| | | | | |
|---|---|---|---|---|
| 604,425 A * | 5/1898 | None | .................. | 137/231 |
| 3,169,881 A * | 2/1965 | Bodine, Jr. | .................. | 428/157 |
| 4,369,608 A * | 1/1983 | Miura et al. | .................. | 52/309.9 |
| 4,374,890 A * | 2/1983 | Shimizu et al. | .................. | 428/212 |
| 4,378,394 A * | 3/1983 | Miura et al. | .................. | 428/113 |
| 4,378,395 A * | 3/1983 | Asoshina et al. | .................. | 428/158 |
| 4,397,914 A * | 8/1983 | Miura et al. | .................. | 428/43 |
| 4,399,174 A * | 8/1983 | Tanaka et al. | .................. | 428/67 |
| 4,421,827 A * | 12/1983 | Phillips | .................. | 428/418 |
| 4,444,818 A * | 4/1984 | Tominaga et al. | .................. | 428/34.5 |
| 4,451,518 A * | 5/1984 | Miura et al. | .................. | 428/137 |
| 4,569,880 A * | 2/1986 | Nishiyama et al. | .................. | 428/212 |
| 4,766,183 A * | 8/1988 | Rizk et al. | .................. | 525/454 |
| 4,770,929 A * | 9/1988 | Nobumasa et al. | .................. | 442/278 |

(Continued)

FOREIGN PATENT DOCUMENTS

CA   2 005 735   6/1990

(Continued)

*Primary Examiner*—William P. Watkins, III
(74) *Attorney, Agent, or Firm*—Woodcock Washburn LLP

(57) ABSTRACT

Multi-layer laminates are provided which contain at least two binder layers and at least two textile-containing layers. One binder layer faces a substrate to be reinforced, with a second binder layer between two textile-containing layers wherein one of the textile-containing layers is interposed between the binder layers. The binder layer facing the substrate has an elasticity modulus when cured which is less than or the same as the elasticity modulus of the second binder layer. The laminates are suitable for reinforcing or stiffening planar substrates, especially thin-walled substrates such as motor vehicle body parts.

19 Claims, 1 Drawing Sheet

U.S. PATENT DOCUMENTS

| | | | |
|---|---|---|---|
| 4,803,105 A * | 2/1989 | Kretow et al. | 428/41.1 |
| 4,828,897 A * | 5/1989 | Staneluis et al. | 428/71 |
| 4,900,601 A * | 2/1990 | Halg et al. | 428/68 |
| 4,929,483 A * | 5/1990 | Halg et al. | 428/47 |
| 5,092,947 A * | 3/1992 | Halg et al. | 156/82 |
| 5,151,327 A * | 9/1992 | Nishiyama et al. | 428/343 |
| 6,004,425 A | 12/1999 | Born et al. | |
| 6,123,171 A * | 9/2000 | McNett et al. | 181/290 |
| 6,361,643 B2 * | 3/2002 | Born et al. | 156/307.3 |
| 6,372,334 B1 * | 4/2002 | Wycech | 428/316.6 |
| 6,573,309 B1 * | 6/2003 | Reitenbach et al. | 521/135 |
| 6,855,652 B2 * | 2/2005 | Hable et al. | 442/226 |
| 2001/0044503 A1 * | 11/2001 | Born et al. | 525/332.5 |
| 2003/0039792 A1 * | 2/2003 | Hable et al. | 428/59 |
| 2003/0176128 A1 * | 9/2003 | Czaplicki et al. | 442/175 |
| 2003/0211329 A1 * | 11/2003 | Fox | 428/416 |

FOREIGN PATENT DOCUMENTS

| | | |
|---|---|---|
| EP | 0 053 361 B1 | 2/1985 |
| EP | 0 056 713 B1 | 8/1985 |
| EP | 0 061 132 B1 | 5/1987 |
| EP | 0 230 666 A2 | 8/1987 |
| EP | 0 278 268 A2 | 8/1988 |
| EP | 0 376 880 A2 | 7/1990 |
| EP | 0 297 036 B1 | 12/1991 |
| EP | 0 298 024 B2 | 6/1996 |
| EP | 0 793 697 B1 | 2/2000 |
| WO | WO 96/23040 A1 | 8/1996 |
| WO | WO 99/50057 A1 | 10/1999 |
| WO | WO 00/52086 A2 | 9/2000 |

* cited by examiner

MULTI-LAYER REINFORCING LAMINATE

CROSS-REFERENCE TO RELATED APPLICATIONS

This application is a continuation under 35 USC Sections 365(c) and 120 of International Application No. PCT/EP2003/011618, filed 21 Oct. 2003 and published 13 May 2004 as WO 2004/039577, which claims priority from German Application No. 10250780.5, filed 30 Oct. 2002, each of which is incorporated herein by reference in its entirety.

FIELD OF THE INVENTION

This invention relates to multilayer laminates comprising at least two binder layers and at least two layers of fiber-containing flat textile materials, to a process for their production, to their use and to a process for stiffening and/or reinforcing flat bodywork parts.

DISCUSSION OF THE RELATED ART

Triggered by improved corrosion prevention for metallic substrates, easier shaping of these thin substrates and lower costs and, above all, by the saving of weight and the resulting saving of fuel in the operation of such lightweight construction vehicles, the use of thin strips, panels or plates in motor vehicle construction has seen a dramatic increase in recent years. Hitherto, stiffening has been achieved either by the welding or bonding of metallic reinforcing panels onto the thin metal plates. In view of the above-mentioned need to save weight, the demand for lightweight, surface- and frame-stiffening systems for various applications in car manufacture is very high. Besides the above-mentioned metal plates, laminate systems based on epoxy resins and/or polyurethanes have hitherto been used for this purpose.

EP 0056713 describes a composite material for metal-plated articles of a heat-curable resin and a metallic front side, a layer of adhesive being arranged between the heat-curable resin layer and the metal front side in order to establish a bond between the metal front side and the heat-curable resin layer. The applications mentioned for these composite materials include decorative metal-coated structural elements, metal-coated water tank sections, metal-coated plastic pipes and tanks and metal-coated components for the transport industry. Stiffening effects of these known composite materials are not mentioned.

EP 0278268 A2 describes a reinforcing laminate suitable for reinforcing metal panels, plastic panels or multilayer sheet molding compounds which comprises a moisture-impermeable barrier layer embedded in a heat-curable adhesive layer. A reinforcing layer, which may consist of a glass fiber cloth, is said to be arranged on the side remote from the substrate to be reinforced. An aluminium foil is proposed as the moisture-impermeable barrier layer. The document in question mentions the reinforcement of steel structural components, such as car bodywork panels, as an application for the reinforcing laminates.

EP 0061132 A2 describes a three-layer stiffening material consisting of a first resin layer with a high elasticity modulus after curing, an underlying second resin layer with a low elasticity modulus after curing and an underlying layer of a heat-expandable material, the expandable material having a smaller surface area than the other two heat-curable layers. On heating, the expandable material is said to expand into a bead-like projection and then to cure. The edges of the other two reinforcing layers are said to project beyond the edges of the bead-forming expandable material and to enter into an adhesive bond with the material to be stiffened.

EP-A-230666 describes a process for the production of a one-component heat-curing composition which, on heating, forms a urethane/epoxy/silicone interpenetrating network (IPN) system. According to the document in question, metal-reinforcing patches are produced from these compositions and adhere directly to oil-containing metal surfaces, such as oily steel plates. The IPN is said to be formed by a polyepoxy compound, a blocked polyamine hardening agent, a chain-extended polyurethane prepolymer, in which some isocyanate groups of the prepolymer are blocked by a hydroxyfunctional polysiloxane.

EP-A-297036 describes a laminate based on a carrier, for example resin-bonded glass fiber cloth, to which a layer of heat-curing resin is applied. In order to protect the tacky resin surface, a cover film of a material that shrinks on exposure to heat is provided. This film is said to be provided with slots which open and widen after a heat pretreatment, so that part of the tacky surface is exposed. It is thus no longer necessary to remove the protective film before application of the laminate. The composition of the tacky resin layer is not discussed.

EP-A-376880 describes a laminate arrangement for stiffening flat structural elements which comprises a carrier layer of a curable synthetic resin material in which a reinforcing material joined thereto or embedded therein is provided. In addition, an adhesive layer is applied to the carrier layer facing the structural element to be stiffened. This adhesive layer comprises a curable synthetic resin optionally provided with fillers and other additives. In order to achieve a strong reinforcing effect without deforming the flat structural element (metal plate), the adhesive layer is said to have a higher elasticity modulus after curing than the cured synthetic resin material of the carrier layer. At the same time, the carrier layer and the adhesive layer are said to have at least substantially the same coefficient of thermal expansion in the cured state as the flat structural element to be stiffened. The carrier layer is said to consist of a glass fiber cloth and a mixture of liquid epoxy resins and solid epoxy resins and hardening agents while the adhesive layer is said to consist essentially of heat-curing self-adhesive synthetic resins which are again made up of liquid and solid epoxy resins and hardening agents and fillers. According to claim 17 of the document in question and in contrast to its general teaching as briefly described in the foregoing, the laminate arrangement is said to consist of a cured carrier layer which has a higher elasticity modulus than the cured adhesive layer. Nowhere in this document is it stated when which layer combination is supposed to be used.

EP-A-298024 describes a process for stiffening metal plates and plastic moldings with a one-layer or multilayer, flat stiffening material in which at least one layer consists of a heat-curing synthetic resin. This stiffening material is said to be subjected to a first heat treatment in which at least one surface of the stiffening material is tackified by the heat treatment. The stiffening material is said then to be applied with its tacky surface to the element to be stiffened, after which the stiffening material is said to be subjected to a second heat treatment until all the layers of the stiffening material are cured. It is proposed that one layer of the stiffening material consist of heat-curing epoxy resins optionally containing glass fiber cloth. An epoxy-based, optionally polyurethane- or copolyester-based, hotmelt adhesive is proposed for the second layer which is supposed to be tackified during the first heat treatment. Alternatively, this layer is said to consist of a film which shrinks on exposure to heat, so that a tacky layer is exposed after shrinkage.

EP 0053361 A1 describes an adhesive layer material for reinforcing metal plates comprising a first epoxy resin layer and a second epoxy resin layer laminated onto the first epoxy resin layer, the first epoxy resin layer after curing having an elasticity modulus which is sufficient to stiffen a metal plate whereas the second epoxy resin layer, after heat curing, is said to have an elasticity modulus which is not sufficient to stiffen the metal plate to be stiffened. This is supposed to reduce the stress caused by shrinkage during curing of the high-modulus layer, so that distortion of the surface of the metal layer to be stiffened is reduced.

WO 99/50057 proposes a three-layer stiffening material which is made up of two polymer layers and one stiffening layer. The polymer layer which faces the substrate to be stiffened is said to be a flexible foam layer after curing while the outer layer arranged on the flexible foam layer is a layer of a rigid foam. The third layer is said to be a film or a glass fiber layer or a carrier for additional stiffening. According to the teaching of this document, the stress caused by the shrinkage of the rigid layer during curing is said to be kept away from the substrate to be stiffened by the layer arrangement in question.

BRIEF SUMMARY OF THE INVENTION

However, the prior art on the subject of stiffening thin substrates of large surface area, such as car doors, roof sections, hood and trunk lids, does not satisfactorily solve the problem of distortion of the thin metal or plastic panels through shrinkage of the stiffening layers, so that this marginal distortion and unevenness still stands out unattractively, particularly in the case of uniformly gloss-painted parts of large surface area.

In view of this prior art, the problem addressed by the present invention was to provide new multilayer laminates for stiffening thin structural elements, more particularly flat bodywork parts in vehicle construction, which would be capable of reducing and correcting any shrinkage caused by the laminate hardening process to such an extent that the stresses would not be transmitted to the substrate to be stiffened, so that read-through effects of the stiffening element would be avoided.

The present invention provides a solution to this problem in the form of multilayer laminates made up of at least one heat-curable and optionally expandable binder layer and at least one other layer of an optionally expandable binder and at least two layers of fiber-containing flat textile materials, the binder layer facing the substrate to be stiffened having the same elasticity modulus as, or a lower elasticity modulus than, the second binder layer. A layer of a fiber-containing flat textile material is arranged between the two binder layers and the second layer of a fiber-containing flat textile material is arranged on the binder layer remote from the substrate to be stiffened.

The elasticity modulus referred to in this specification is the elasticity modulus (also known as the Young's modulus) of the cured binder layers, optionally in the form of a combination of binder layer and adjoining textile layer.

The present invention also relates to a process for stiffening or reinforcing flat substrates of metal or plastic which comprises the following process steps:

(a) extruding the uncured binder layer (12) optionally onto a protective film;
(b) applying the textile layer (13);
(c) extruding the binder layer (14) onto the textile layer (13);
(d) applying the textile layer (15) to the binder layer (14);
(e) optionally rolling down the edges so that the binder layer (12 and/or 14) is thicker in the middle than at the edges;
(f) optionally cutting or stamping the laminate to size and making it up;
(g) applying the shaped laminate to the substrate to be stiffened;
(h) curing the laminate on the substrate by heating them both to temperatures of 110 to 210° C. and preferably to temperatures of 130 to 180° C.

In another embodiment, the multilayer laminates may also be produced in two stages. To this end, the uncured binder layer (12) is applied to the textile layer (13) and, in a separate step, the binder layer (14) is applied to the textile layer (15). Depending on the machine layout, the fabric layers may also be applied to the binder layers. The two two-layer systems are then separately shaped by stamping or cutting and are then pressed together to form the four-layer laminate. The remaining free side of the uncured binder layer (12) may optionally be covered during storage of the laminate by a protective film which is removed immediately before application of the laminate to the substrate to be stiffened.

DETAILED DESCRIPTION OF CERTAIN EMBODIMENTS OF THE INVENTION

Figure 1:
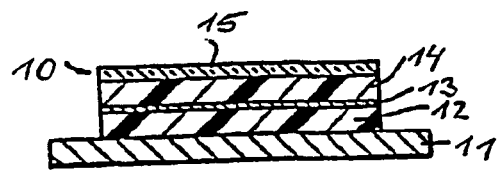
FIG. 1 illustrates the basic layer sequence of the laminate according to the invention applied to the substrate to be stiffened.

In one particular embodiment, the surfaces of the binder layer (14) and the flat textile (15) which are remote from the substrate to be stiffened are smaller than the surfaces of the binder layer and the flat textile which face the substrate to be stiffened. The distance of the edge lines between the smaller and the larger surfaces can be between 0.05 and 3 cm and is preferably between 1 and 1.5 cm over the entire peripheral regions. The distances are largely determined by the overall surface area and geometry of the stiffening laminate and by the properties of the substrate to be stiffened.

In another embodiment, both the binder layer facing the substrate to be stiffened and the binder layer remote from the substrate to be stiffened decrease in thickness towards their edges. This measure can also lead to a reduction in the shrinkage-induced stresses of the stiffened laminate.

A further reduction in shrinkage can be achieved by a wave or sawtooth profile instead of a linear profile for the edges of the layer.

In addition, a reduction in shrinkage-induced stresses can be achieved by forming holes or slots in all the layers of the laminate or only in the binder layer remote from the substrate to be stiffened and the fabric layer (15). The holes or slots may be arranged in staggered rows. In the cured state, the elasticity modulus of the binder layer remote from the substrate is between 400 and 1,400 MPa. The elasticity modulus of the binder layer facing the substrate to be stiffened is between 0.2 and 1,400 MPa and preferably between 30 and 1,400 MPa.

The fiber-containing, additionally stiffening flat textile materials used may be selected from nonwoven, woven or knitted fabrics of aramid fibers, carbon fibers, glass fibers, polyamide fibers, polyimide fibers, polyethylene fibers, polypropylene fibers or polyester fibers. Not only do these flat textile materials have an additional stiffening effect, the textile layer between the two binder layers in particular is also able to absorb and reverse the stresses produced by shrinkage during-the hardening of the binder layers and thus to contribute towards minimizing or eliminating the visible distortion of the stiffened substrate so that there are no read-through effects of the stiffening element on the outside of the substrate.

Suitable binders for the two middle layers are, in particular, one-component, heat-curable systems such as, for example, the one-component epoxy resin binder mixtures described, for example, on pages 6 to 11 of WO 00/52086. Basically, however, simpler epoxy resin mixtures of one or two epoxy resins and heat-activatable hardeners and also fillers are also suitable, as are binder systems based on liquid rubbers containing unsaturated double bonds, optionally in admixture with solid rubbers and vulcanizing agents, vulcanization accelerators and catalysts as described, for example, in WO 96/23040, pages 6 to 10, or in EP 0793697 B1, pages 4 and 5. Also suitable for the binder layer facing the substrate to be stiffened are low-modulus binder systems based on rubber, more particularly on butyl rubbers which contain no crosslinking systems and which, after curing of the stiffening laminate, remain thermoplastic, in extreme cases even permanently plastic, and which are therefore ideally suitable for reversing shrinkage-induced stresses. Heat-curable polyurethane systems are also suitable for the two binder layers, more particularly where curing is carried out at relatively low temperatures, for example in the paint line of a car assembly plant. Hybrid systems based on reactive epoxy resins and polyurethane polymers are also suitable for formulating the binder layers. In addition, thin film-like adhesive layers, which are applied to the side of the fabric layer (13) facing the substrate to be stiffened and which remain stable and build up sufficient adhesion to the substrate and the fabric layer (13) under the particular hardening conditions, may be used for the low-modulus layer (12).

In addition, block copolymers of the AB or ABA type of styrene and butadiene, styrene and isoprene or hydrogenation products thereof are suitable as polymers for the binders. These polymers may be used both in their reactive form as crosslinkable polymers containing reactive groups and in their non-reactive form as thermoplastic elastomers.

Basically, the binder layers—besides the polymers—also consist of fillers, optionally plasticizers and extenders, crosslinking agents and other typical auxiliaries and additives known per se, such as pigments, antiagers and optionally blowing agents.

The multilayer laminates according to the invention are preferably applied to the substrates to be stiffened at the "white shell" stage of the car assembly process, so that the curable layers are cured in the oven following cathodic electrodeposition painting (CEP). In the CEP oven, the binder layers cure at temperatures of 110° C. to 210° C. and preferably at temperatures of 130° C. to 180° C.

However, the stiffening multilayer laminates may also be applied at a later stage of the vehicle assembly process, i.e., on the paint line after the CEP oven. Since the following stoving ovens of the paint line generally have lower temperatures compared with the CEP oven, it is recommended in these cases to use binder systems which cure at those lower temperatures, as is the case with polyurethane systems for example.

The binder layer facing the substrate to be stiffened can perform both purely adhesive functions and a stiffening function and—optionally—an acoustic damping (vibration-damping or sound-insulating) function. The binder systems of the two layers are selected so that constituents of one layer are unable to migrate into the other layer. In addition, the two binder layers are intended to establish a firm bond with the flat textile materials, so that no delamination can occur. In the cured state, the binder layers have thicknesses of 0.01 to 3 mm. In preferred embodiments, the binder layers do not have uniform layer thicknesses, but are thicker in the middle than at their edges (layer thickness approaching 0).

The shapes thus produced may optionally be stored or transported to the end user, generally the car manufacturer. Here, the protective film—if any—is removed from the binder layer, the shape is applied to the structural element to be reinforced or stiffened and the binder is cured at temperatures of 110° C. to 210° C. and preferably at temperatures of 130° C. to 180° C. in the paint drying ovens, generally in the oven for hardening the electrodeposition coating.

The multilayer laminates according to the invention are described in more detail in the following with reference to the accompanying drawings, wherein:

FIG. 1 illustrates the basic layer sequence of the laminate according to the invention applied to the substrate to be stiffened.

Figures 2, 3:
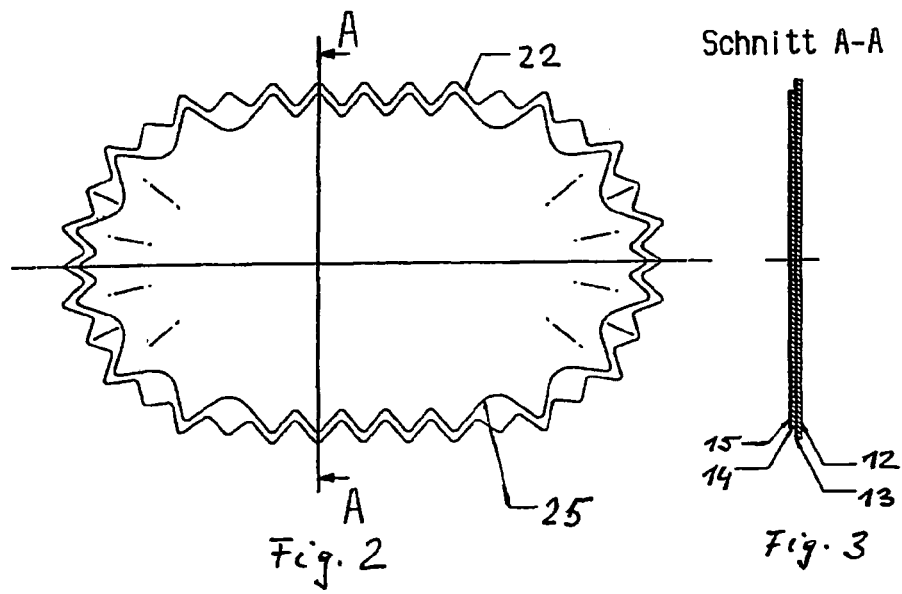
FIG. 2 is a plan view of the surface of a preferred embodiment of the multilayer laminate.
FIG. 3 is a section through FIG. 2 on the line A-A.

FIG. 2 is a plan view of the surface of a preferred embodiment of the multilayer laminate.

FIG. 3 is a section through FIG. 2 on the line A-A.

Figures 4, 5:
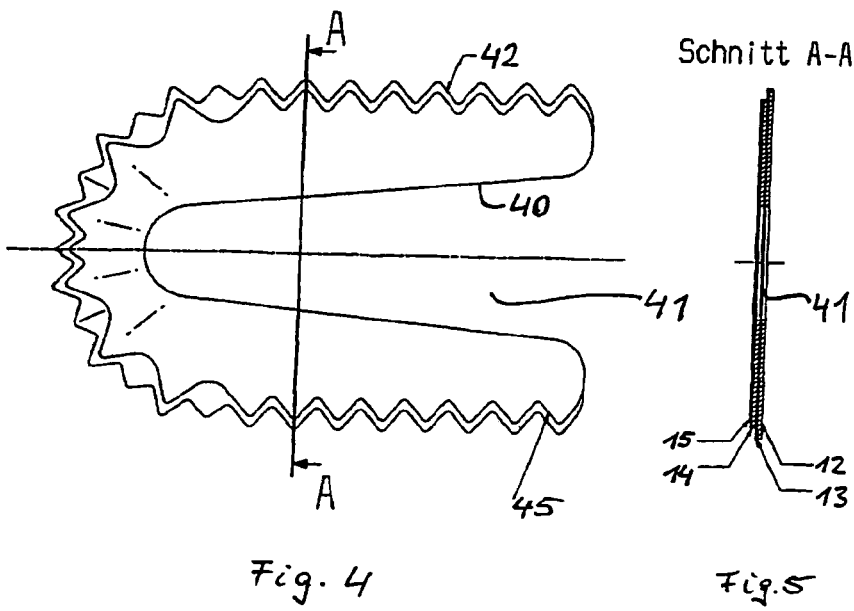
FIG. 4 shows another special embodiment of a laminate in accordance with the invention.
FIG. 5 is a section through the laminate of FIG. 4 on the line A-A.

FIG. 4 shows another special embodiment of a laminate in accordance with the invention.

FIG. 5 is a section through the laminate of FIG. 4 on the line A-A.

FIG. 1 shows the basic layer sequence (10) of a substrate according to the invention coated with a four-layer stiffening laminate. Applied to the substrate (11) to be stiffened is the binder layer (12) which faces the substrate and which, after curing, is permanently adhesively bonded to the substrate. Arranged between the first binder layer (12) and the second binder layer (14) is a first layer of a flat textile material (13) which, in the cured state of the layer system, enters into a permanent bond with both binder layers and which is capable of partly absorbing the tensile stresses occurring through shrinkage during curing of the binder system and cooling of the laminate, so that they are unable to impact on the substrate (11) to be stiffened. Another layer of a flat textile material (15) is applied to the binder layer (14) and, after curing of the laminate, is permanently adhesively bonded to the layer system. The combination of the binder layer (14) and the textile layer (15) makes the largest contribution to the stiffening effect. For this reason, the binder layer (14) in its cured state has a higher elasticity modulus in many applications than the binder layer (12), although in borderline cases the elasticity moduli of the two layers may also be the same.

FIG. 2 is a plan view of the surface of one embodiment of the multilayer laminate, in which the surface is substantially elliptical in shape and the edges of the binder layer (22) facing the substrate to be stiffened and the edges of the binder layer (25) remote from the substrate to be stiffened have a wave-like profile. At the same time, it can be seen from FIG. 2 that the binder layer facing the substrate to be stiffened is larger in size than the binder layer remote from the substrate to be stiffened, so that the edges of the binder layer and the textile layer facing the substrate project beyond the overlying binder layer and textile layer remote from the substrate.

FIG. 3 is a section through the multilayer laminate on the line A-A of FIG. 2. The binder layer (12) facing the substrate to be stiffened and the following textile fabric layer (13) are again larger in surface area and project beyond the binder layer (14) remote from the substrate to be stiffened and the overlying textile fabric layer (15). The substrate to be stiffened is not shown in FIG. 3. In principle, the multilayer laminate shown in FIGS. 2 and 3 could also be substantially rectangular in shape, optionally with rounded corners. In addition, both a rectangular embodiment and the elliptical embodiment shown could be bordered by straight edges.

FIG. 4 is a plan view of the surface in a special embodiment in which the laminate has a semi-elliptical opening (41) where there is no binder or textile layer, i.e., the opening extends right through the laminate. In this case, the cut edges of both binders and textile layers are straight in the region of this opening and both cut edges lie congruently one above the other. The outer edges of the binder layers (42) and (45) again have wave-like profiles and the edge of the binder layer (42) facing the substrate to be stiffened again projects beyond the overlying binder layer (45) and its textile layer.

FIG. 5 is a section on the line A-A through the four-layer laminate shown in FIG. 4. The binder layer (12) again faces the substrate to be stiffened, the flat textile fabric layer (13) has the same outer dimensions as the binder layer (12) and again lies between the binder layer (12) and the binder layer (14) remote from the substrate to be stiffened on which the second flat textile fabric layer (15) is disposed. FIG. 5 also shows the opening (41).

The drawings mentioned above only illustrate the principle of the multilayer laminate according to the invention and two special embodiments. In principle, the four-layer stiffening laminates may be adapted in their geometric dimensions to the particular application envisaged and may assume any geometric surface form. In addition, either all four layers may be penetrated by holes or slots or the slots or holes may extend only to the binder layer (14) and fabric layer (15) remote from the substrate to be stiffened.

Although the above-described four-layer construction of the multilayer stiffening laminates is the preferred construction, multilayer laminates comprising more than four layers can also be produced.

The principal application for the multilayer laminates according to the invention are thin metal structures or plastic panels requiring stiffening such as are used in car production for doors, roof sections, hood or trunk lids, dashboards and instrument panels. The folding endurance and flexural strength and also the vibration properties of the substrate are improved. In principle, the stiffening laminates according to the invention could also be used in the manufacture of machinery and white goods.

What is claimed is:

1. A multilayer laminate for stiffening a flat substrate comprising at least two heat-curable binder layers and two layers of fiber-containing flat textile materials, wherein a first binder layer faces the substrate to be stiffened, a second binder layer is remote from the substrate to be stiffened, a first layer of a fiber-containing flat textile material is arranged between the first binder layer and the second binder layer, a second layer of a fiber-containing flat textile material is arranged on the second binder layer remote from the substrate to be stiffened, the first binder layer facing the substrate to be stiffened being adhesively joined to the substrate to be stiffened and having the same elasticity modulus as, or a lower elasticity modulus than, the second binder layer when cured, wherein the surface areas of the second binder layer and the second layer of flat textile material are smaller than the surface areas of the first binder layer and the first layer of flat textile material.

2. A multilayer laminate for stiffening a substrate, comprising:
   a first heat-curable binder layer for contacting the substrate;
   a second heat-curable binder layer, said first binder layer having an elasticity modulus less than or equal to the second binder layer when cured;
   a first textile layer interposed between the first and second binder layers; and
   a second textile layer affixed to the second binder layer distal to the first textile layer, wherein:
   a) the surface areas of the second binder layer and the second textile layer are smaller than the surface areas of the first binder layer and the first textile layer; or
   b) the laminate has openings which extend only through the second binder layer and the second textile layer.

3. A laminate as claimed in claim 2, wherein the first binder layer facing the substrate to be stiffened and the first layer of flat textile material decrease in layer thickness towards their edges.

4. A laminate as claimed in claim 2, wherein the second binder layer remote from the substrate to be stiffened and the second layer of flat textile material decrease in layer thickness towards their edges.

5. A laminate as claimed in claim 2, wherein the edges of the laminate are not straight.

6. A laminate as claimed in claim 2, wherein the edges of the laminate have a wave or sawtooth profile.

7. A laminate as claimed in claim 2, wherein the first and second layers of fiber-containing flat textile material are selected from the group consisting of nonwoven, woven or knitted fabrics of aramid fibers, carbon fibers, glass fibers, polyamide fibers, polyimide fibers, polyethylene fibers, polypropylene fibers and polyester fibers.

8. A laminate as claimed in claim 2, wherein the second binder layer when cured has an elasticity modulus of 400 to 1,400 MPa while the first binder layer when cured has an elasticity modulus of 0.2 to 1,400 MPa.

9. A laminate as claimed in claim 2, wherein the second binder layer when cured has an elasticity modulus of 400 to 1,400 MPa while the first binder layer when cured has an elasticity modulus of 30 to 1,400 MPa.

10. A laminate as claimed in claim 2, wherein the laminate has holes or slots which extend through all layers of the laminate.

11. A multilayer laminate for stiffening a flat substrate comprising at least two heat-curable binder layers and two layers of fiber-containing flat textile materials, wherein a first binder layer faces the substrate to be stiffened, a second binder layer is remote from the substrate to be stiffened, a first layer of a fiber-containing flat textile material is arranged between the first binder layer and the second binder layer, a second layer of a fiber-containing flat textile material is arranged on the second binder layer remote from the substrate to be stiffened, the first binder layer facing the substrate to be stiffened being adhesively joined to the substrate to be stiffened and having the same elasticity modulus as, or a lower elasticity modulus than, the second binder layer when cured, wherein the laminate has holes or slots which extend only through the second binder layer and the second layer of fiber-containing flat textile material.

12. A laminate as claimed in claim 10, wherein the holes or slots are arranged in staggered rows.

13. A laminate as claimed in claim 11, wherein the holes or slots are arranged in staggered rows.

14. A laminate as claimed in claim 2, wherein at least one of the first binder layer or second binder layer is comprised of at least one epoxy resin, at least one heat-activatable hardener, and at least one filler.

15. A laminate as claimed in claim 2, wherein at least one of the first binder layer or the second binder layer is comprised of at least one liquid rubber containing unsaturated double bonds or a heat-curable polyurethane.

16. A laminate as claimed in claim 2, wherein the first binder layer is comprised of a thermoplastic rubber.

17. A process for stiffening a thin, flat substrate, comprising applying the laminate of claim 2 to said substrate and curing said laminate.

18. The process of claim 17, wherein said substrate is a motor vehicle part selected from the group consisting of doors, roof parts, hoods and trunk lids.

19. A laminate as claimed in claim 1, wherein:
the first binder layer facing the substrate to be stiffened and the first layer of flat textile material decrease in layer thickness towards their edges;
the second binder layer remote from the substrate to be stiffened and the second layer of flat textile material decrease in layer thickness towards their edges; or
both binder layers and both layers of flat textile materials decrease in layer thickness towards their edges.

* * * * *